United States Patent Office 3,553,304

Patented Jan. 5, 1971

3,553,304

METHOD OF SOLVENT CASTING POLY-1,3-BENZOXAZINE-2,4-DIONE ELECTRIC INSULATING FILMS

Eckart Reese, Dormagen, Wilhelm Rohm, Stommeln, Hermann Hofmeier, Dormagen, Ludwig Bottenbruch, Krefeld-Bockum, and Hermann Schnell, Krefeld-Uerdingen, Germany, assignors to Farbenfabriken Bayer Aktiengesellschaft, Leverkusen, Germany, a corporation of Germany No Drawing. Filed Feb. 13, 1968, Ser. No. 704,989
Claims priority, application Germany, Feb. 21, 1967, F 51,579
Int. Cl. B29d 7/02; C08g 22/00; D01d 5/12
U.S. Cl. 264—210 2 Claims

ABSTRACT OF THE DISCLOSURE

The invention relates to poly-1,3-benzoxazine-2,4-dione electric insulating films obtained by casting a solution of a polymer consisting essentially of a poly-1,3-benzoxazine-2,4-dione in an inert organic solvent to form a film, drying and stretching said film, the poly-1,3-benzoxazine-2,4-dione being obtained by reaction of a di-o-hydroxyaryl dicarboxylic acid aryl ester with an organic diisocyanate in an organic solvent in a one step reaction.

This invention relates to highly heat resistant films, especially electrically insulating films from polybenoxazine diones and to a process for producing the films from solutions of these polybenzoxazine diones.

It is already known that one may produce films from polybenzoxaine diones by a multi-stage process in which the soluble polyurethanes obtained by reacting dihydroxy-dicarboxylic acids with diisocyanates are first dissolved in suitable solvents and the polyurethane films produced from these solutions are then converted into insoluble polybenzoxazine dione films by heating said films with liberation of alcohol. This is obviously industrially uneconomical since apart from the need to carry out the process in several stages, unavoidable waste is produced, for example, in cutting up the films since the cut-offs cannot be used again owing to their insolubility.

It is an object of this invention to provide poly-1,3-benzoxazine-2,4-dione electric insulating films which are obtained by casting a solution of said poly-1,3-benzoxazine-2,4-dione in an inert organic solvent, selected from the group consisting of halogenated hydrocarbons, dimethylformamide, dimethylacetamide, tetramethylenesulfone and dimethylsulfoxide, to form a film, drying and stretching said film to at least twice its original length, said stretching being effected at temperatures of above 200° C., said poly-1,3-benzoxazine-2,4-dione being obtained by reaction of a di-o-hydroxyaryl dicarboxylic acid arylester with an organic diisocyanate in an organic solvent in a one step reaction.

It is another object of this invention, to provide a process for the production of a poly-1,3-benzoxazine-2,4-dione film, which comprises casting a solution of a poly-1,3-benzoxazine-2,4-dione in an inert organic solvent, selected from the group consisting of halogenated hydrocarbons, dimethylformamide, dimethylacetamide, tetramethylenesulfone and dimethylsulfoxide to form a film, drying and stretching said film to at least twice its original length, said stretching being effected at temperatures of above 200° C., said poly-1,3-benzoxazine-2,4-dione being obtained by reaction of a di-o-hydroxyaryl dicarboxylic acid arylester with an organic diisocyanate in an organic solvent in a one step reaction.

The preferable temperature for effecting the stretching is in the range of from about 250 to about 300° C.

The following are examples of suitable inert organic solvents: dimethylformamide, dimethylacetamide, tetramethylenesulfone, dimethylsulfoxide, halogenated hydrocarbons such as methylene chloride, chloroform, tetrachloroethane and chlorobenzene. Mixtures of these solvents with other solvents such as aromatic hydrocarbons (benzene, toluene), aliphatic ethers (diethylether, diisopropylether) or cyclic ethers (dioxane, tetrahydrofuran) may also be used.

The process according to the invention is much simpler than the known process since it enables films to be produced in one working step. The films produced in this way have the same solubility as the polybenzoxazine diones used as starting materials. Owing to their solubility, the above-mentioned waste can be used again, making the process much more economical to operate.

Owing to the solubility of the material in certain organic solvents, the films subsequently can easily be bonded together with known adhesives or even merely using solvents. On the other hand, the resistance to many solvents is sufficiently high to prevent damage by the usual liquid impregnating agents used in the electrical industry.

The films produced by the process are eminently suitable for insulating electrical machinery and apparatus that operate permanently at temperatures of 180 C. or more. The films, which may be stretched along one or two axes to improve their mechanical properties, have an overall combination of properties which makes them especially suitable for use as highly heat resistant electrical insulating films. Apart from their exceptionally high continuous heat endurance (age resistance) they also exhibit high thermal resistance which renders them insensitive to exposure for brief periods to temperatures considerably above the normal operating temperature. The electrical properties range from good to very good and within the range of operating temperatures normally encountered in practice they do not vary very much with temperature. The films can therefore also advantageously be used as dielectric materials for condensers.

Their solubility properties are also very advantageous. Their solubility in certain solvents enables films to be produced by the casting process from solution, this process being especially suitable for the production of electrical insulating films owing to the possibility of filtering the solutions prior to casting. Mechanical contamination of the films with dust etc. can thereby be avoided. This solubility also enables the waste that is invariably formed to be used again. This is of great importance with respect to the economy of the process. By far the major proportion of electrical insulating films are used in band form. When the films are cut up into bands one must expect a wastage of 10 to 15% of the original quantity. In the production by the casting process from solution, the waste is not damaged by the effects of temperature during the manufacturing process. It can therefore be dissolved and reused in the process as top quality raw material.

The following examples are to further illustrate the invention without limiting it.

EXAMPLE 1

1 kg. of a co-polybenzoxazine dione of 80% diphenyl ether-4,4'-diisocyanate, 20% 1,5-naphthylenediisocyanate and 4,4'-dihydroxydiphenyl-3,3'-dicarboxylic acid diphenylester is dissolved with stirring in 8.5 kg. of dimethyl formamide. The solution is filtered, deaerated, and cast to form a film 0.02 mm. in thickness on a casting machine in known manner. The film is dried at 160° C. for 2 hours to remove residual solvent.

Properties:

| | |
|---|---|
| Tensile strength | 12 to 15 kg. wt./mm.² |
| Elongation on tearing | 80 to 100. |
| Dimensional stability under tension under brief thermal stress | 360° C. |
| Dielectric constant (20° C., 50 c./s.) | 3.6. |
| Loss factor (20° C., 50 c./s.) | 2.10³. |

The limiting temperature (according to VDE 0304, part 2/7.59) is above 180° C.

The film obtained as described above is stretched in the longitudinal direction in the ratio of 3:1 at 285° C. The resulting film has a tensile strength of 40 kg. wt./mm.$^2$ and an elongation on tearing of 40%. The other properties are unchanged.

Preparation of the polybenzoxazine dione: 151.35 parts by weight of diphenylether-4,4′-diisocyanate (0.80 mol) and 31.50 parts by weight of naphthylene-1,5-diisocyanate (0.20 mol) are dissolved in 2,325 parts by volume of anhydrous dimethylsulfoxide at a temperature of 85° C. 319.80 parts by weight of 4,4′-dihydroxydiphenyl-3,3′-dicharboxylic acid phenyl ester and 0.63 part by weight of diethylene triamine are added and heated at 100° C. under stirring. After 30 minutes the reaction mixture is diluted with 3,000 parts by volume of dimethylsulfoxide and 2,000 parts by volume of methylene chloride. The polymer precipitates and is isolated in a quantitative yield. It has a rel. solution viscosity $\eta_{rel.}$ of 2.15 (measured by 1 g. of the polymer dissolved in 100 cm.$^3$ of dimethylformamide at a temperature of 25° C.) and a molecular weight of about 50,000.

EXAMPLE 2

1 kg. of a polybenzoxazine dione of diphenyl-2,2-propane-4,4′-diisocyanate and 4,4′-dihydroxydiphenyl-3,3′-carboxylic acid diphenyl ester is dissolved with stirring in 8.5 kg. of tetrachloroethane. The solution is filtered, deaerated, and cast into a film on a casting machine in known manner. The film is dried at 160° C. for 10 to 30 minutes, depending on its thickness, to remove residual solvents. The film was stretched in the longitudinal direction in the ratio of 2.5:1 at a temperature of 300° C.

The polybenzoxazine dione from diphenyl-2,2-propane-4,4′-diisocyanate and 4,4′-dihydroxydiphenyl-3,3′-dicarboxylic acid diphenyl ester is obtained in analogous manner as the polybenzoxazine dione of Example 1.

What we claim is:

1. A process for the production of a poly-1,3-benzoxazine-2,4-dione film, which comprises casting a solution of a polymer consisting essentially of a poly-1,3-benzoxazine-2,4-dione in an inert organic solvent, selected from the group consistng of halogenated hydrocarbons, dimethylformamide, dimethylacetamide, tetramethylenesulfone and dimethylsulfoxide, to form a film, drying and stretching said film to at least twice its original length, said stretching being effected at temperatures of above 200° C., said poly-1,3-benzoxazine-2,4-dione being obtained by reaction of a di-o-hydroxyaryl dicarboxylic acid arylester with an organic diisocyanate in an organic solvent in a one step reaction.

2. The process of claim 1, said stretching being effected at a temperature in the range of from about 250 to 300° C.

References Cited

UNITED STATES PATENTS

| | | | |
|---|---|---|---|
| 3,244,675 | 4/1966 | Angelo | 260—47 |
| 3,269,970 | 8/1966 | Epstein et al. | 264—184 |
| 3,424,728 | 1/1969 | Nakanishi et al. | 260—47 |

ROBERT F. WHITE, Primary Examiner

JEFFERY, R. THURLOW, Assistant Examiner

U.S. Cl. X.R.

260—47, 77.5; 264—216